United States Patent [19]

Stokes et al.

[11] Patent Number: 5,605,739
[45] Date of Patent: Feb. 25, 1997

[54] NONWOVEN LAMINATES WITH IMPROVED PEEL STRENGTH

[75] Inventors: Ty J. Stokes, Suwanee; Karen L. English, Marietta, both of Ga.

[73] Assignee: Kimberly-Clark Corporation, Neenah, Wis.

[21] Appl. No.: 576,521

[22] Filed: Dec. 21, 1995

Related U.S. Application Data

[63] Continuation-in-part of Ser. No. 379,373, Jan. 27, 1995, Pat. No. 5,534,339, which is a continuation-in-part of Ser. No. 201,582, Feb. 25, 1994, Pat. No. 5,424,115.

[51] Int. Cl.$^6$ .................................................. B32B 27/14
[52] U.S. Cl. ........................ 428/198; 428/373; 428/218; 442/364; 442/392; 442/398
[58] Field of Search ............................. 428/198, 284, 428/286, 296, 297, 298, 373, 218

[56] References Cited

U.S. PATENT DOCUMENTS

| | | | |
|---|---|---|---|
| 3,117,906 | 1/1964 | Tanner | 161/177 |
| 3,200,440 | 8/1965 | Bryan et al. | 18/8 |
| 3,297,807 | 1/1967 | Settele | 264/171 |
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartmann | 264/210 |
| 3,536,802 | 10/1970 | Uraya et al. | 264/171 |

(List continued on next page.)

FOREIGN PATENT DOCUMENTS

| | | | |
|---|---|---|---|
| 0088744 | 9/1983 | European Pat. Off. | |
| 0522995A2 | 1/1993 | European Pat. Off. | D01F 8/06 |
| 0604731A1 | 7/1994 | European Pat. Off. | B32B 31/00 |
| 0340763B1 | 10/1994 | European Pat. Off. | D01F 8/06 |
| 2061156 | 3/1990 | Japan. | |
| 5186951 | 7/1993 | Japan. | |
| 5186955 | 7/1993 | Japan. | |
| 5263353 | 10/1993 | Japan. | |
| 965729 | 8/1964 | United Kingdom. | |

OTHER PUBLICATIONS

J. Lunenschloss & W. Albrecht (Ed.)/Ellis Horwood Ltd: "Nonwoven Bonded Fabrics": pp. 311–314 (1985).*
R. J. Rogers: "Methods, Materials and Products of Thermal Bonding" in Principles of Nonwovens: pp. 633–650.*
A. Drelich: "Thermal Bonding with Fusible Fibers" in Nonwovens Industry, Sep. 1985, pp. 12–26.*
L. M. Landoll & B. J. Hostetter: "Dependence of Thermal Bonded Coverstock Properties on Polypropylene Fiber Characteristics" in Polypropylene Fibers and Textiles IV, Sep. 1987, pp. 41/1–41/8.*
P. Olivieri, M. Branchesi & T. Ricupero: "Thermal Bonding—The Fastest-Growing Application for Polypropylene Staple: Success and Development" in Polypropylene Fibers and Textiles IV, Sep. 1987, pp. 40/1–40/10.*

*Primary Examiner*—James J. Bell
*Attorney, Agent, or Firm*—William D. Herrick

[57] ABSTRACT

Laminates with improved peel strength are obtained by point bonding thermoplastic layers wherein one of the layers comprises sheath/core bicomponent fibers or filaments wherein the density of the core component exceeds the density of the sheath component and both layers contain compatible components. Peel strengths of at least about 125% of those obtained without such bicomponent fibers or filaments are obtained. Laminates with films and other nonwovens also have a broad bonding window. They are useful for many nonwoven applications including barrier applications such as health care including surgical gowns and drapes, institutional garments, agricultural fabrics, recreational fabrics, and personal care product components.

18 Claims, 1 Drawing Sheet

U.S. PATENT DOCUMENTS

| | | | |
|---|---|---|---|
| 3,542,615 | 11/1970 | Dobo et al. | 156/181 |
| 3,692,618 | 9/1972 | Dorschner et al. | 161/72 |
| 3,725,192 | 4/1973 | Ando et al. | 161/175 |
| 3,780,149 | 12/1973 | Keuchel et al. | 264/168 |
| 3,787,162 | 1/1974 | Cheetham | 425/463 |
| 3,788,940 | 1/1974 | Ogata | 161/173 |
| 3,802,817 | 4/1974 | Matsuki et al. | 425/66 |
| 3,849,241 | 11/1974 | Butin et al. | 161/169 |
| 3,855,045 | 12/1974 | Brock | 161/146 |
| 3,855,046 | 12/1974 | Hansen et al. | 161/150 |
| 3,895,151 | 7/1975 | Matthews et al. | 428/102 |
| 3,924,045 | 12/1975 | Ogasawara et al. | 428/373 |
| 3,940,302 | 2/1976 | Matthews et al. | 156/167 |
| 4,005,169 | 1/1977 | Cumbers | 264/103 |
| 4,035,219 | 7/1977 | Cumbers | 156/290 |
| 4,041,203 | 8/1977 | Brock et al. | 428/157 |
| 4,211,816 | 7/1980 | Booker et al. | 428/296 |
| 4,285,748 | 8/1981 | Booker et al. | 156/167 |
| 4,306,929 | 12/1981 | Menikheim et al. | 156/290 |
| 4,340,563 | 7/1982 | Appel et al. | 264/518 |
| 4,374,888 | 2/1983 | Bornslaeger | 428/198 |
| 4,396,366 | 8/1983 | Kessler et al. | 425/131.5 |
| 4,424,257 | 1/1984 | Bach | 428/370 |
| 4,424,258 | 1/1984 | Bach | 428/370 |
| 4,547,420 | 10/1985 | Krueger et al. | 428/229 |
| 4,555,430 | 11/1985 | Mays | 428/134 |
| 4,588,630 | 5/1986 | Shimalla | 428/131 |
| 4,596,742 | 6/1986 | Selivansky et al. | 428/373 |
| 4,601,949 | 7/1986 | Bach et al. | 428/374 |
| 4,729,371 | 3/1988 | Krueger et al. | 128/206.19 |
| 4,761,322 | 8/1988 | Raley | 428/198 |
| 4,774,124 | 9/1988 | Shimalla | 428/171 |
| 4,795,668 | 1/1989 | Krueger et al. | 428/174 |
| 4,806,299 | 2/1989 | Burns | 264/171 |
| 4,830,904 | 5/1989 | Gessner et al. | 428/219 |
| 4,981,749 | 1/1991 | Kubo et al. | 428/219 |
| 5,057,361 | 10/1991 | Sayovitz et al. | 428/290 |
| 5,068,141 | 11/1991 | Kubo et al. | 428/219 |
| 5,071,705 | 12/1991 | Tanaka et al. | 428/370 |
| 5,108,820 | 4/1992 | Kaneko et al. | 428/198 |
| 5,143,786 | 9/1992 | Tanaka et al. | 428/357 |
| 5,167,764 | 12/1992 | Nielsen et al. | 162/146 |
| 5,167,765 | 12/1992 | Nielsen et al. | 162/146 |
| 5,178,931 | 1/1993 | Perkins et al. | 428/198 |
| 5,207,970 | 5/1993 | Joseph et al. | 264/518 |
| 5,232,770 | 8/1993 | Joseph | 428/284 |
| 5,238,733 | 8/1993 | Joseph et al. | 428/284 |
| 5,256,050 | 10/1993 | Davies | 425/131.5 |
| 5,290,626 | 3/1994 | Nishio et al. | 428/224 |
| 5,336,552 | 8/1994 | Strack et al. | 428/224 |
| 5,364,694 | 11/1994 | Okada et al. | 428/288 |
| 5,372,885 | 12/1994 | Tabor et al. | 428/373 |
| 5,382,400 | 1/1995 | Pike et al. | 264/168 |
| 5,424,115 | 6/1995 | Stokes | 428/198 |

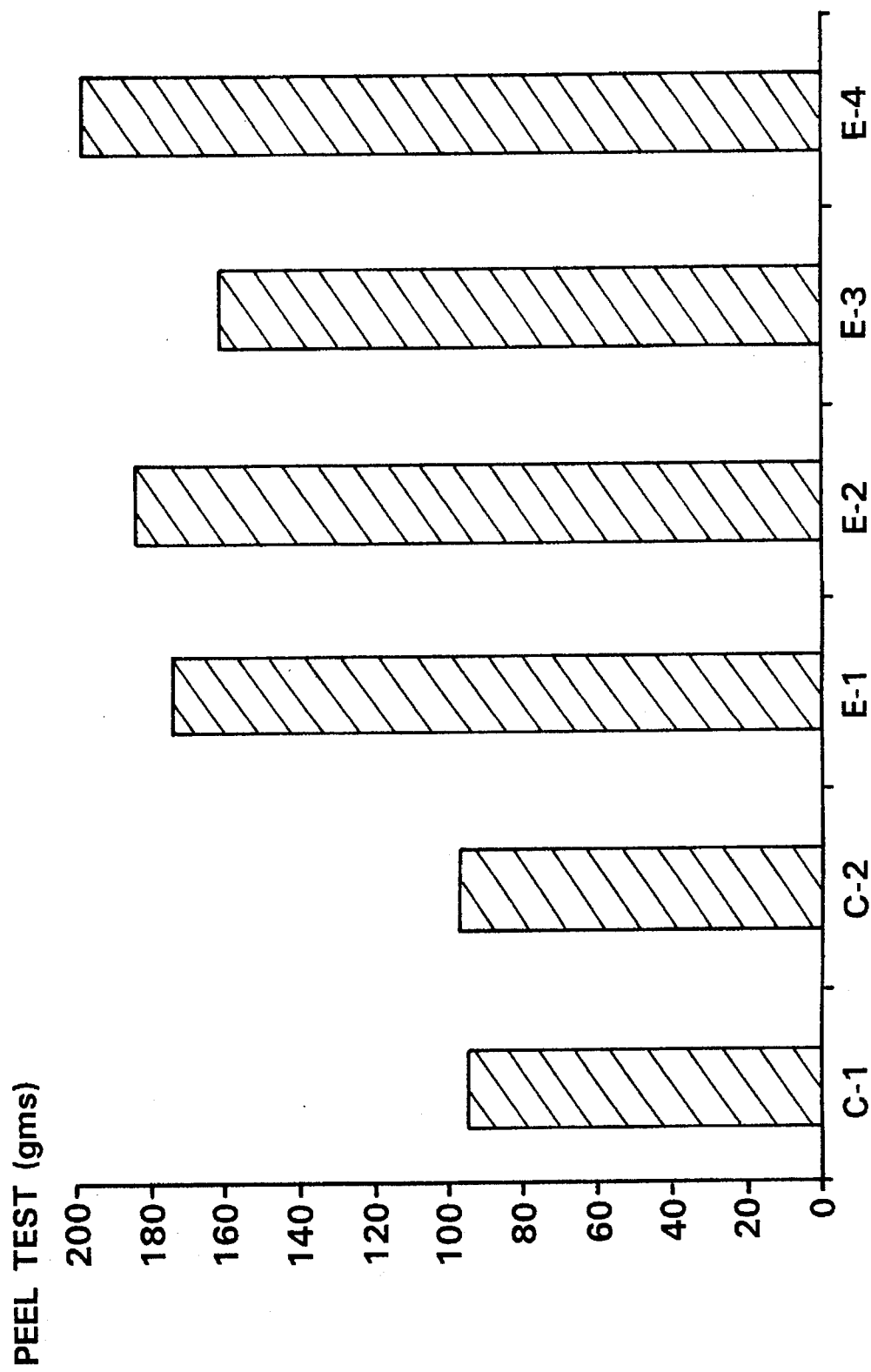

1

NONWOVEN LAMINATES WITH IMPROVED PEEL STRENGTH

This application is a continuation-in-part of application Ser. No. 08/379,373 filed Jan. 27, 1995 U.S. Pat. No. 5,534,339 issued Jul. 9, 1996 which is a continuation-in-part of application Ser. No. 08/201,582 filed Feb. 25, 1994 now U.S. Pat. No. 5,424,115 issued Jun. 13, 1995.

BACKGROUND OF THE INVENTION

Nonwoven fabrics and their manufacture have been the subject of extensive development resulting in a wide variety of materials for numerous applications. For example, nonwovens of light basis weight and open structure are used in personal care items such as disposable diapers as liner fabrics that provide dry skin contact but readily transmit fluids to more absorbent materials which may also be nonwovens of a different composition and/or structure. Nonwovens of heavier weights may be designed with pore structures making them suitable for filtration, absorbent and barrier applications such as wrappers for items to be sterilized, wipers or protective garments for medical, veterinary or industrial uses. Even heavier weight nonwovens have been developed for recreational, agricultural and construction uses. These are but a few of the practically limitless examples of types of nonwovens and their uses that will be known to those skilled in the art who will also recognize that new nonwovens and uses are constantly being identified. There have also been developed different ways and equipment to make nonwovens having desired structures and compositions suitable for these uses. Examples of such processes include spunbonding, meltblowing, carding, and others which will be described in greater detail below. One type of process for manufacturing nonwovens is conjugate or bicomponent spinning. The present invention has general applicability to bicomponent sheath/core nonwovens as will be apparent to one skilled in the art, and it is not to be limited by reference or examples relating to specific nonwovens which are merely illustrative.

It is not always possible to efficiently produce a nonwoven having all the desired properties as formed, and it is frequently necessary to combine the nonwoven with one or more component layers of the same or different construction or composition. Examples include other nonwovens or films which can improve properties such as barrier and strength. The success of such laminates is often dependent on the ability to provide strong interlayer bonding or peel strength to prevent unintended separation into component layers. The type of bonding is important for commercial and functional reasons, and various means have been employed such as heat, heat and pressure, pressure, adhesives and mechanical steps such as entangling or the like. For many applications a combination of heat and pressure, for example hot calendering, provides the best combination of function and efficiency. However, for some applications it is desired to improve the peel strength in such laminates bonded by heat and pressure.

SUMMARY OF THE INVENTION

The present invention is directed to laminates wherein at least one layer includes sheath/core bicomponent fibers or filaments with a higher density core component than sheath component and wherein the laminate peel strength is at least 125% of that obtained under similar bonding conditions using monocomponent fibers or filaments of the same or similar composition or sheath/core multicomponent fibers or filaments without such a density difference. The layer or layers of the laminate bonded to this sheath/core bicomponent layer include films and nonwovens having a polymer that is compatible with the sheath component. Preferred embodiments include those where the peel strength is even higher, at least about 180% and an actual value in excess of about 110 grams, and where the sheath component is a polyolefin and the core component is a polyolefin, a polyamide or a polyester. Other preferred embodiments include those where the bonded layer or layers is a film including heterophasic olefin polymer compositions of the type available under the designation Catalloy from Montell Inc. These laminates find applications in garments, infection care products, protective covers, outdoor fabrics, personal care products, health care products, and other areas where such laminates have been used and provide improved functionality due to the increased peel strength. Laminates of the present invention are particularly advantageous because high peel strengths may be obtained at lower bond temperatures, thus preserving desirable film properties. In some cases greater economy may be obtained by reducing the weight of such laminates where peel strength integrity required higher weights in prior laminates.

BRIEF DESCRIPTION OF THE DRAWING

The FIGURE is a bar graph showing improved peel strength properties obtained in accordance with the present invention.

DETAILED DESCRIPTION OF THE INVENTION

DEFINITIONS

As used herein the term "nonwoven fabric or web" means a web having a structure of individual fibers or threads which are interlaid, but not in a regular or identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91.)

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Harmann, U.S. Pat. No. 3,502,538 to Levy, and U.S. Pat. No. 3,542,615 to Dobo et al. Spunbond fibers are generally not tacky when they are deposited onto a collecting surface. Spunbond fibers are quenched and generally continuous and have average diameters larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, are generally smaller than 10 microns in diameter, and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

The term "component" is not meant to exclude fibers formed from one or more polymers to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, through air bonding or "TAB" means a process of bonding a nonwoven bicomponent fiber web in which air which is sufficiently hot to melt one of the polymers of which the fibers of the web are made is forced through the web. The air velocity is between 100 and 500 feet per minute and the dwell time may be as long as 6 seconds. The melting and resolidification of the polymer provides the bonding. Through air bonding has restricted variability and is generally regarded a second step bonding process. Since TAB requires the melting of at least one component to accomplish bonding, it is restricted to webs with two components such as bicomponent fiber webs.

As used herein, "ultrasonic bonding" means a process performed, for example, by passing the fabric between a sonic horn and anvil roll as illustrated in U.S. Pat. No. 4,374,888 to Bornslaeger which can be considered a form of thermal point bonding.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen which has a percent bond area of about 15% and about 302 bonds per square inch (per 6.45 square centimeters). Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "bonding window" means the range of temperature of the mechanism, e.g. calender rolls, used to bond the nonwoven fabric together, over which such bonding is successful. For polypropylene spunbond, this bonding window is typically from about 270° F. to about 310° F. (132° C. to 154° C). Below about 270° F. the polypropylene is not hot enough to melt and bond and above about 310° F. the polypropylene will melt excessively and can stick to the calender rolls. Polyethylene has an even narrower bonding window.

As used herein, the term "barrier fabric" means a fabric which is relatively impermeable to the transmission of liquids, i.e., a fabric which has blood strikethrough rate of 1.0 or less according to ASTM test method 22.

As used herein, the term "garment" means any type of non-medically oriented apparel which may be worn. This includes industrial workwear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, tablecloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial workwear and coveralls, pants, shirts, jackets, gloves, socks, shoe coverings, and the like.

TEST METHODS

To determine peel strength a laminate is tested for the amount of tensile force which will pull the layers of the laminate apart. Values for peel strength are obtained using a specified width of fabric, usually 4 inches (102 mm), clamp width and a constant rate of extension. The film side of the specimen is covered with masking tape or some other suitable material to prevent the film from ripping apart during the test. The masking tape is on only one side of the laminate and so does not contribute to the peel strength of the sample. The sample is delaminated by hand a sufficient amount to allow it to be clamped into position. The specimen is clamped in, for example, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia, Pa. 19154, which have at least 4 inches (102 mm) long parallel clamps. The sample specimen is then pulled apart at 180° of separation at a rate of 300 mm (about 12 inches) per minute and the tensile strength recorded in grams as the average based on the generated curve.

Hydrohead: A measure of the liquid barrier properties of a fabric is the hydrohead test. The hydrohead test determines the pressure of a column of water (in millibars) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514, also AATC Method 127–1989 and INDA Test Method 80.4–92.

EXAMPLES

The invention will be illustrated by examples which, as will be appreciated by those skilled in the art, are representative only and not intended to limit the invention as defined by the claims. Other examples are embraced by the claims and are intended to be included within the broad scope of the invention.

It is also possible to use polymer blends as a component and to have other materials blended with one or both of the polymer components used to produce a nonwoven according to this invention like fluorocarbon chemicals to enhance chemical repellency which may be, for example, any of those taught in U.S. Pat. No. 5,178,931, additives for increased wettability such as those taught in U.S. Pat. No. 5,057,361, fire retardants for increased resistance to fire and/or pigments to give each layer the same or distinct colors. Fire retardants and pigments for spunbond and meltblown thermoplastic polymers are known in the art and are internal additives. A pigment, if used, is generally present in an amount less than 5 weight percent of the layer while other materials may be present in a cumulative amount less than 25 weight percent.

The "bonding window" or range of temperature and pressure conditions under which effective bonding occurs is important in achieving the improved results of the present invention. The bonding window is known for most common polymer combinations and may be established by a simple series of peel tests over different temperature and pressure conditions. In accordance with the present invention, higher peel strengths are obtained within the bonding window and effective bonding is attained within a broader range of temperatures.

The basis weight is also a significant factor as those skilled in the art will appreciate. For example, heat and pressure bonding of extremely heavy nonwovens, for example, above about 150 gsm, is very difficult as is bonding of very heavy films, for example, above about 3 mils due to inability to achieve uniform heat transfer efficiently. In general, the benefits of the present invention are best obtained with nonwovens in a basis weight range of from about 10 gsm to about 150 gsm, preferably about 15 gsm to about 100 gsm and films in a range of from about 0.1 mils to about 3 mils, preferably about 0.3 mils to about 1.0 mils. For a given set of bonding conditions, the basis weight also affects laminate peel strengths as heavier basis weights generally require hotter bonding temperatures and/or slower speeds. For basis weights of 1 osy (34 gsm) or greater of the nonwoven component, for example, temperatures required often have a deleterious effect on a film component of the laminate. It is a feature of the present invention that such deleterious effects may be avoided because of the high peel strengths obtained at lower bonding temperatures.

While the mechanism for the present invention is not certain and the invention is not to be limited thereby, it is believed that the higher density core of the bicomponent fibers localizes the bonding energy in the sheath thereby increasing the efficiency of the bonding. The extent of the density difference is not critical, but to obtain best results it should be at least about 0.04 g/cc and preferably within the range of above at least about 0.02 g/cc. Within these ranges, in general, the greater the difference, the higher will be the level of improvement.

The nonwoven sheath/core bicomponent nonwovens used in the laminates of the present invention are preferably formed in accordance with the teachings of U.S. Pat. No. 5,424,115, which is incorporated herein by reference in its entirety. In general, the polymers are extruded through known sheath/core bicomponent spinning apparatus to form continuous bicomponent sheath/core filaments with the higher density component core. These filaments are deposited on a foraminous wire or forming surface moving at a rate to achieve the desired basis weight. The web is then directed to a heated bonding calender nip and pattern bonded with a desired pattern. For the following examples, the equipment and processing conditions described with respect to Examples 1–3 of U.S. Pat. No. 5,424,115 were used to form sheath/core bicomponent fiber spunbond nonwovens including Control #1 below in which case the same polypropylene was fed to both extruders to form a monocomponent fiber spunbond nonwoven. The same bond pattern and bonding conditions were also used. Except as indicated otherwise, all nonwovens were produced at a basis weight of 1 osy (34 gsm).

Control #1

Using a process and equipment as described in above-referenced U.S. Pat. No. 5,424,115 a nonwoven spunbond fabric having a basis weight of 1 osy (34 gsm) was formed using polypropylene (PD3445 from Exxon) with a density of 0.91 in both the sheath and core of bicomponent fibers.

Control #2

Control #1 was repeated using a linear low density polyethylene (6811A from Dow) with a density of 0.94 in the sheath and the same polypropylene in the core.

EXAMPLES #1–4

Using the same process and equipment used for the controls, sheath/core bicomponent spunbond nonwovens were prepared using the following combinations of polymers: polypropylene (PD3445 from Exxon), density 0.91 sheath/nylon 6 (401D from Custom Resin), density 1.14 core—Example #1; linear low density polyethylene (6811A from Dow), density 0.94 sheath/nylon 6 (401D from Custom Resin), density 1.14 core—Example 2; polypropylene (PD3445 from Exxon), density 0.91 sheath/linear low density polyethylene (6811A from Dow), density 0.94 core—Example 3; and polypropylene (PD3445 from Exxon), density 0.91 sheath/polyethylene terephthalate copolymer (Vitel 4400 from Shell), density 1.36 core—Example 4. With the exception of the polyethylene terephthalate, each polymer contained 2% titanium dioxide. With the exception of Example 3, proportions were 50-50 sheath/core by weight. Example 3 was 65% sheath and 35% core. Each of the webs was bonded using the same H-P patterned application of heat and pressure to produce a point bond pattern of 310 regularly spaced bonds per square inch (per 6.45 square centimeters) and about 15% bonded area using a nip pressure of about 87 pounds per linear inch (15.55 kg/linear cm) except for Example 1 which was bonded using a wire weave pattern of 302 bonds per square inch (about 47 per square centimeter) and about a 15% bonded area. During bonding the temperature and pressure conditions were varied and the resulting webs observed to determine the effective bonding window.

Laminates

Each of the above-identified control and example fabrics was laminated to a blown film of the following composition by weight: 60% calcium carbonate, 20% Catalloy heterophasic olefin polymer composition designated Catalloy X11395-5-1, 16% random propylene/ethylene copolymer (5.5% ethylene) available from Shell, and 4% linear low density polyethylene (Dow 6401). The film was stretched unidirectionally to a basis weight of 0.5 osy (17 gsm). The laminating equipment used was a heated calender nip that applied a "H-P" pattern as described above. The pattern roll had a temperature setting of 250 degrees F. (121 degrees Celsius) and the anvil roll had a temperature setting of 165 degrees F. (74 degrees Celsius). The nip pressure was 87 lbs./linear inch (15.55 kg/linear cm). Line speed was about 40 feet per minute (12.2 meters per minute). Such conditions typically would result in underbonded laminates, but increased temperatures and pressures frequently have produced film pinholes and loss of barrier properties. Each of the laminates was tested for peel strength, and the results are reported below.

TABLE 1

| Sample | S/C | Bonding Window | Peel v. Control #1% (g) |
| --- | --- | --- | --- |
| C#1 | PP/PP | NA | 100 (95) |
| C#2 | LLDPE/PP | Narrow | 102 (97) |
| E#1 | PP/N6 | Broad | 183 (174) |
| E#2 | LLDPE/N6 | Broad | 194 (184) |
| E#3 | PP/LLDPE | Broad | 156 (148) |
| E#4 | PP/PET | Broad | 180 (198) |

Turning to the FIGURE, these results are shown in bar graph form. As can be seen, the laminates of the present invention using sheath/core bicomponent nonwovens with higher density core components provides not only a more forgiving, broader bonding window for the nonwoven component, but much improved peel strength properties as well. While Control #2 when repeated at a nonwoven basis weight of 0.5 osy (17 gsm) showed improvement in peel strength, it was still with a narrow bonding window. Each of the examples had a peel strength more than 125% times that obtained with the monocomponent filaments and with the filaments where the component densities were reversed. Advantageously the results will be at least about 150% and may be 180% and higher. As can also be seen, the difference in densities need not be great, and it is believed that a difference of as little as about 0.04 g/cc will show benefit in accordance with the invention.

Hydrohead test results demonstrated that barrier properties were maintained in accordance with the invention. The results in terms of mbar for the first and third (in parentheses) drops were as follows: Control #1: 404 (burst); Control #2: 337 (339); Example #1: 345 (398); Example #2: 403 (burst); Example #3: 384 (422); Example #4: 301 (305).

The other component of the laminate is not limited to films, but it is believed the benefits of the invention will result with laminates of nonwovens and other thermally bondable sheets or webs so long as they contain a thermoplastic component compatible with the sheath component of the bicomponent fibers used in the nonwoven.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations that fall within the scope of the invention as defined by the claims. Such alternatives, modifications and variations include equivalents in function as well as structure. For example, a screw and a nail may not be equivalent structures, but in fastening applications may be functional equivalents.

We claim:

1. A laminate comprising a first thermoplastic polymer film or nonwoven layer thermally bonded to a second thermoplastic polymer nonwoven layer comprising sheath/core bicomponent fibers or filaments wherein the density of the core component exceeds the density of the sheath component and said first film or nonwoven comprises a polymer compatible with said sheath component and wherein the peel strength of said laminate exceeds about 125% of that obtained under similar thermally bonding conditions using a nonwoven wherein said density difference does not exist as said second nonwoven layer.

2. The laminate of claim 1 wherein said first layer is a film and said peel strength value is at least about 150%.

3. The laminate of claim 2 wherein said peel strength value is at least about 180%.

4. The laminate of claim 1 wherein said film comprises a polyolefin and said bicomponent fibers or filaments have a sheath selected from the group consisting of polyolefins and a core selected from the group consisting of polyolefins, polyamides, and polyesters.

5. The laminate of claim 4 wherein said sheath is polypropylene and said core is a polyamide.

6. The laminate of claim 5 wherein said polyamide is nylon 6.

7. The laminate of claim 4 wherein said sheath is polypropylene and said core is polyethylene terephthalate based.

8. The laminate of claim 4 wherein said film comprises a heterophasic polyolefin composition.

9. The laminate of claim 5 wherein said film comprises a heterophasic polyolefin composition.

10. The laminate of claim 7 wherein said film comprises a heterophasic polyolefin composition.

11. The laminate of claim 8 wherein said sheath also comprises a heterophasic polyolefin composition.

12. A personal care article having as a component the laminate of claim 1.

13. An infection control product having as a component the laminate of claim 1.

14. A protective cover article having as a component the laminate of claim 1.

15. A garment having as a component the laminate of claim 1.

16. An outdoor fabric comprising the laminate of claim 1.

17. A thermally point bonded laminate comprising a first film layer including a ethylene compatible polymer and a second nonwoven layer comprising bicomponent sheath/core fibers or filaments wherein the sheath comprises an ethylene based polymer having a density and said core comprises an amide based polymer having a density and wherein said core density exceeds said sheath density and wherein said laminate has a peel strength that is at least 125% of that obtained under similar bonding conditions when said second nonwoven layer is a nonwoven without said density difference.

18. A thermally point bonded laminate comprising a first film layer including a propylene compatible polymer and a second nonwoven layer comprising bicomponent sheath/core fibers or filaments wherein the sheath comprises a propylene based polymer having a density and said core comprises a composition selected from the group consisting of amide based polymers, ethylene based polymers and polyesters having a density and wherein said core density exceeds said sheath density and wherein said laminate has a peel strength that is at least 125% of that obtained under similar bonding conditions when said second nonwoven layer is a nonwoven without said density difference.

* * * * *